United States Patent [19]
Mochizuki et al.

[11] Patent Number: 5,657,672
[45] Date of Patent: Aug. 19, 1997

[54] TRANSMISSION CASING INCLUDING REINFORCING RIB AND POCKET PART

[75] Inventors: Akira Mochizuki; Tomokazu Yamamoto, both of Fuji, Japan

[73] Assignee: Jatco Corporation, Japan

[21] Appl. No.: 546,375

[22] Filed: Oct. 20, 1995

[30] Foreign Application Priority Data

Oct. 31, 1994 [JP] Japan .................................. 6-267346

[51] Int. Cl.$^6$ .................................................. F16H 57/02
[52] U.S. Cl. ................................................... 74/606 R
[58] Field of Search ....................................... 74/606 R

[56] References Cited

U.S. PATENT DOCUMENTS

| | | | |
|---|---|---|---|
| 3,613,481 | 10/1971 | Lapinski | 74/606 R X |
| 3,942,502 | 3/1976 | Gorres et al. | 74/606 R X |
| 4,226,200 | 10/1980 | Morisawa et al. | 74/606 R |
| 4,467,754 | 8/1984 | Hayashi et al. | 74/606 R X |
| 4,885,953 | 12/1989 | Sweetland et al. | 74/606 R |
| 4,995,971 | 2/1991 | Droste et al. | 74/606 R X |
| 5,231,894 | 8/1993 | Okita et al. | 74/606 R |

FOREIGN PATENT DOCUMENTS

| | | | |
|---|---|---|---|
| 3806996A1 | 9/1988 | Germany. | |
| 1869 | 1/1984 | Japan | 74/606 R |
| 405 039 838 | 2/1993 | Japan | 74/606 R |
| 405 280 619 | 10/1993 | Japan | 74/606 R |

*Primary Examiner*—Charles A. Marmor
*Assistant Examiner*—Mary Ann Battista
*Attorney, Agent, or Firm*—Rossi & Associates

[57] ABSTRACT

A casing body of a transmission casing has an oil pan mounting flange including an oil pan joint surface for joining an end surface of the oil pan, and a housing mounting flange including a housing joint surface for joining an end surface of a housing. The oil pan mounting flange and the housing mounting flange are provided substantially perpendicularly to each other. A reinforcing rib is formed parallel to the oil pan joint surface to reinforce the casing body. A pocket part is formed on the back surface of the reinforcing rib opposite to the direction of the oil pan joint surface, and a processing/assembling reference hole is formed in the reinforcing rib at a location of the rib where the pocket part is formed. As the reference hole is obtained without protruding the flanges, a greater degree of design freedom is provided and material costs are reduced. Further, if the flange is clamped, a claiming force is not exerted on the reference hole, thereby preventing deformation or displacement of the hole.

4 Claims, 3 Drawing Sheets

TRANSMISSION CASING INCLUDING REINFORCING RIB AND POCKET PART

BACKGROUND OF THE INVENTION

1. Field of the Invention

The present invention relates to a transmission casing.

2. Description of the Prior Art

It is conventionally known that a processing/assembling hole used for positioning upon a transmission casing being assembled and processed is provided in the transmission casing. Such a reference hole is disclosed in "EC-AT Structure and Service" (Mazda Motor Corporation, Published May, 1985) for example. FIG. 3 shows the conventional structure disclosed in the above publication. A body 01 of the transmission casing has an oil pan mounting flange 03 having an oil pan joint surface 02 for joining the end surface of the oil pan. There is formed a protrusion 04 protruded outwardly on part of the oil pan mounting flange 03, and a processing/assembling hole 05 is formed in the protrusion 04. Further, on the casing body 01 a housing mounting flange 08 having a housing joint surface 07 for joining the end surface of a housing not illustrated in the figure with the transmission casing is formed.

The foregoing conventional transmission casing however has the following difficulties.

Since the conventional transmission casing is constructed such that part of the oil pan mounting flange 03 is protruded, the material cost is increased corresponding to the additional fraction of the protrusion 04, and there is produced the possibility of the protrusion 04 interfering to peripheral instruments to result in the reduced freedom of the design of the transmission casing.

Since the protrusion 04 is flange-shaped, when external force is applied to the protrusion by its being clamped or interfering to other parts upon its being processed or oil pan's being assembled, the protrusion 04 might be deformed to make it difficult for it to be positioned.

There are occasions where a plurality of reinforcing ribs are perpendicularly provided on the outer periphery of a differential gear unit housing 06 of the casing body 01 and further where further reinforcing ribs are provided for supporting the foregoing reinforcing ribs intersecting the same. With such construction, however, a pocket part is sometimes formed on the back side of the further reinforcing ribs. This might cause the possibility of rainwater being collected in the pocket part.

SUMMARY OF THE INVENTION

In view of the drawbacks with the prior art, it is an object of the present invention to provide a transmission casing which is capable of reducing the cost and increasing the freedom of a design by forming reference holes for processing and assembling without protruding an oil pan mounting flange.

It is another object of the present invention to prevent positions of the reference holes from being displaced owing to the deformation.

And it is further object of the present invention to prevent water from being collected in a pocket part of a reinforcing rib.

To achieve the above objects the present invention provides reference holes for processing and assembling in a reinforcing rib.

According to the present invention, in a transmission casing which has an oil pan mounting flange having an oil pan joint surface for joining an end surface of the oil pan with a casing body and a housing mounting flange having a housing joint surface for joining an end surface of the housing and provided substantially perpendicularly to said oil pan mounting flange, a reinforcing rib is formed on said casing body parallely with said oil pan joint surface, a pocket part is formed with said reinforcing rib and substantially parallel two adjacent walls intersecting said reinforcing rib substantially perpendicularly from the upper portion, and a reference hole is formed in said reinforcing rib at a location of the pocket part of the same.

A transmission casing according to the present invention is constructed in another aspect thereof such that said oil pan mounting flange is formed on a peripheral edge of an opening provided in a lower surface of a transmission mechanism housing of the casing body, said housing mounting flange is formed on a peripheral edge of an opening provided in a side surface of a differential gear unit housing of the casing body, said reinforcing rib is perpendicularly provided on an outer surface of said differential gear unit housing and a plurality of sub reinforcing ribs are provided on the outer surface vertically intersecting the reinforcing rib, and said pocket part is formed surrounded by the outer surface of said differential gear unit housing, the reinforcing rib, and the sub reinforcing rib.

A transmission casing according to the present invention is constructed in further another aspect such that the lower surface of said reinforcing rib is disposed displaced to the back surface of the reinforcing rib from the flat surface on said oil pan joint surface, a boss is provided on the circumferences of said reference hole, and end surface of the boss is disposed on the same flat surface as said oil pan joint surface.

In accordance with the foregoing one aspect and another aspect of the present invention, upon assembling or processing a positioning jig such as a locating pin is inserted into the reference hole to achieve positioning.

Since the reference hole is provided in the high strength reinforcing rib it is difficult to be deformed even though external force is exerted on the transmission casing upon the positioning.

The part of the oil pan mounting flange or of the housing mounting flange is constructed not to be protruded for the reference hole. Therefore, there is no possibility of the protrusion interfering with peripheral instruments upon assembling and there is no possibility of the circumferences of the reference hole from being deformed upon each flange being clamped.

Also since the reference hole is provided in the reinforcing rib, when the oil pan and the housing are assembled the reference hole is not overlapped with the oil pan and the housing, and hence is prevented from disappearing behind them. The reference hole is therefore also utilized when the transmission casing is carried and fixed.

When rainwater enters the pocket part in the state where the transmission casing is mounted on a car, the rainwater falls from the reference hole and is hence prevented from being collected in the pocket part.

In accordance with the foregoing further another aspect of the present invention, a boss is protruded on the circumference of the reference hole, and the end surface of which boss is set to be flush with the oil pan joint surface so that the end surface of the boss and the oil pan joint surface can be simultaneously processed.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENT

In what follows, there will be described a preferred embodiment of a transmission casing according to the present invention with reference to the accompanying drawings.

Figure 1:
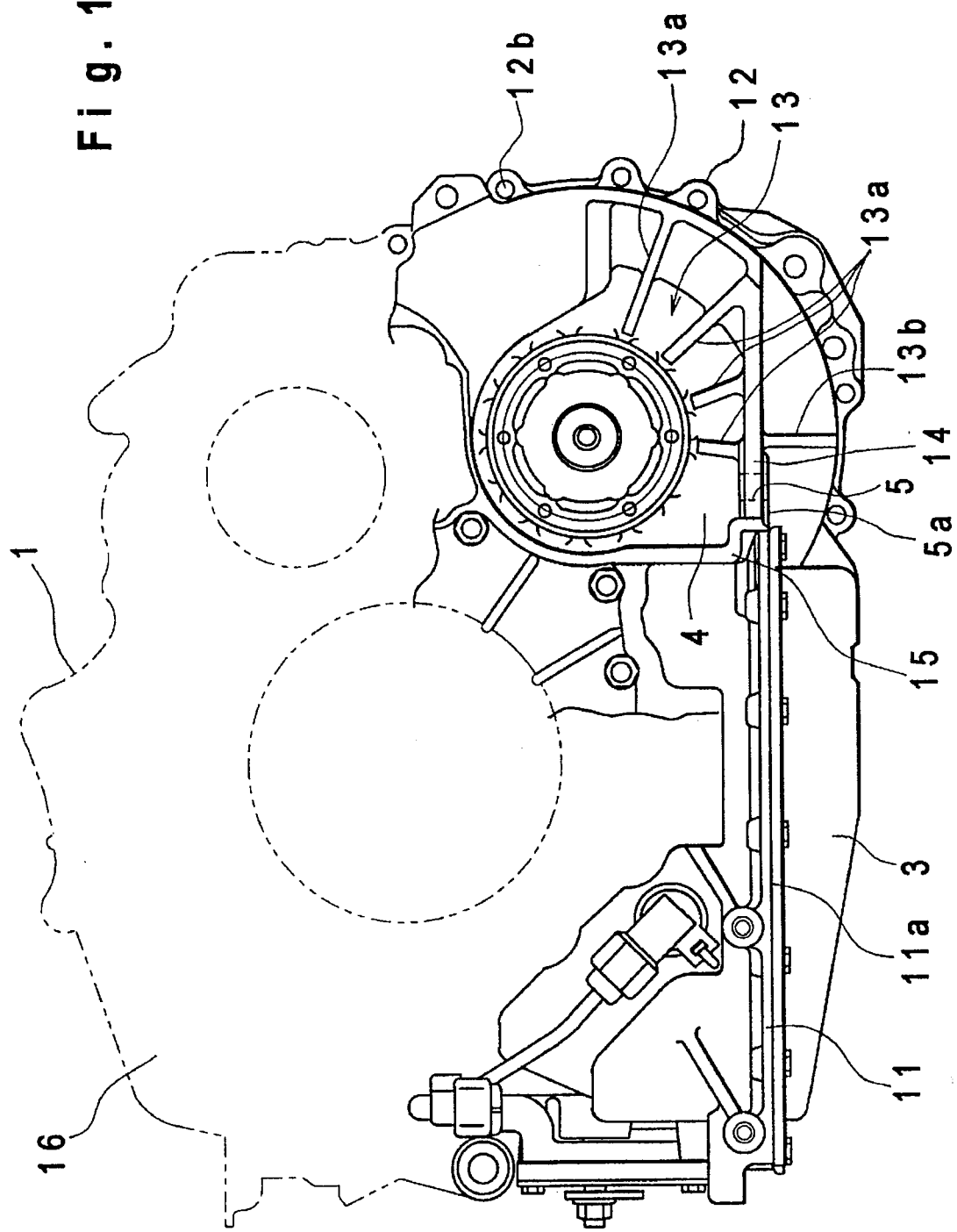
FIG. 1 is a front view illustrating an embodiment of a transmission casing according to the present invention.
Figure 2:
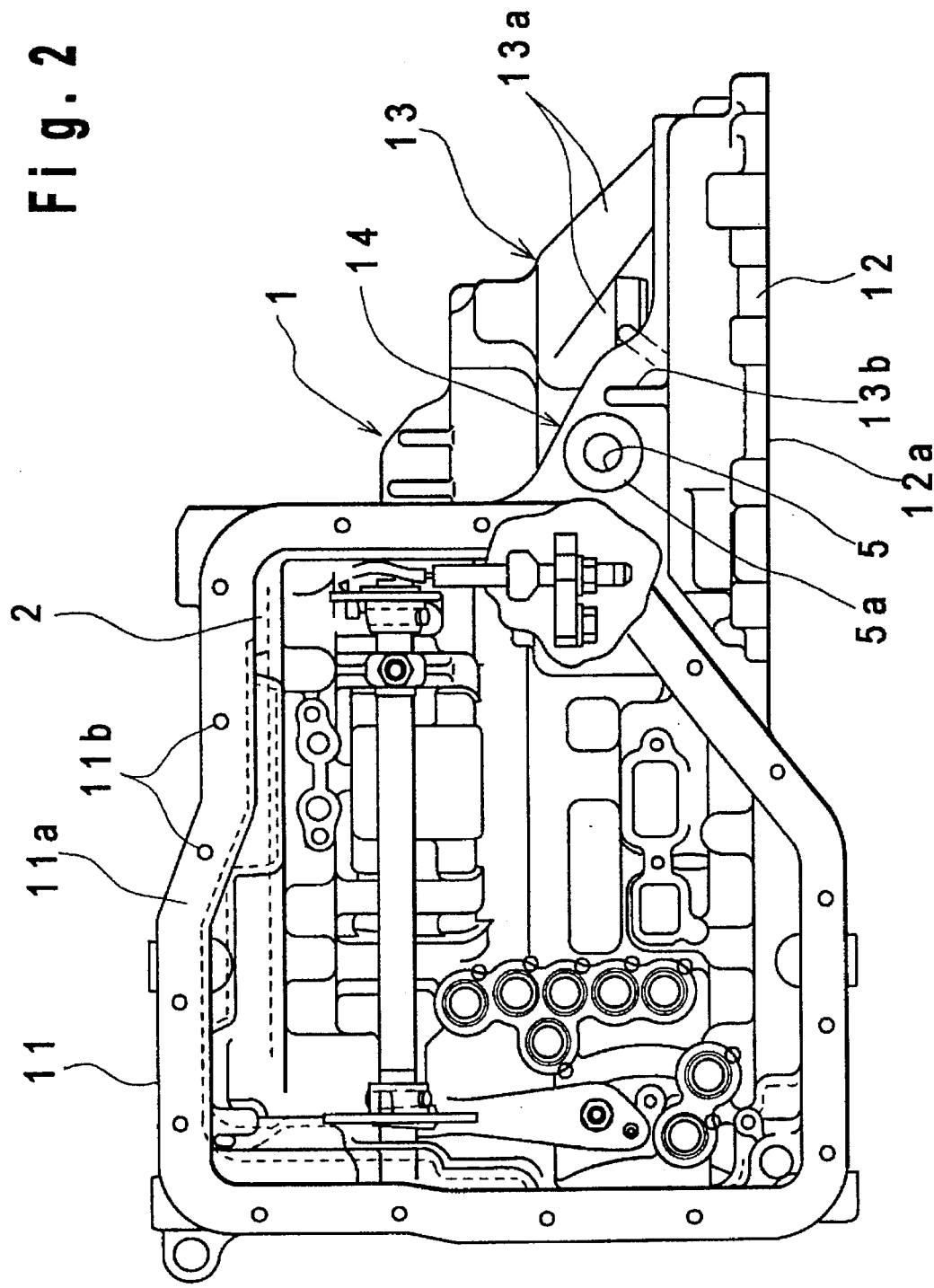
FIG. 2 is a bottom view illustrating the embodiment of FIG. 1.
Figure 3:
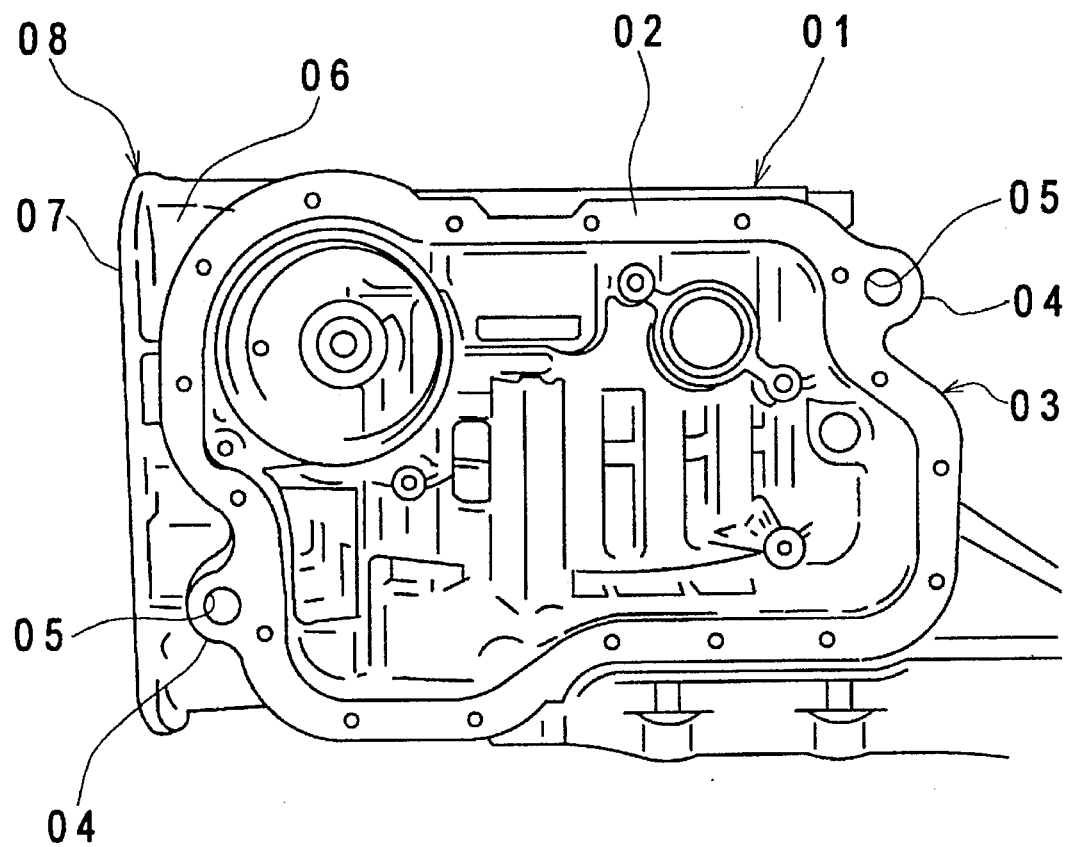
FIG. 3 is a bottom view illustrating a prior art example.

FIG. 1 is a front view illustrating a transmission casing of the embodiment of the present invention, and FIG. 2 is a bottom view of the same.

Referring to FIG. 1, a casing body 1 includes a differential gear unit housing 13 for accommodating a differential gear unit (not shown) and a transmission mechanism housing 16 for accommodating a transmission mechanism that includes planetary gears, etc., (not shown).

On the circumference of an opening 2 illustrated in FIG. 2 there is formed an oil pan mounting flange 11 that includes an oil pan joint surface 11a with which an upper end surface of the oil pan 3 is joined for mounting of the oil pan 3. The oil pan mounting flange 11 includes bolt holes 11b formed at a predetermined interval in the oil pan joint surface 11a.

The differential gear unit housing 13 is formed substantially into a conical configuration, and on an opening end edge of the housing 13 a housing mounting flange 12 having a housing joint surface 12a for joining an end surface of the housing (not shown) is provided. The housing joint surface 12a and the housing mounting flange 12 are provided at the angle of 90 degrees with respect to the oil pan joint surface 11a and the oil pan mounting flange 11, respectively. The housing mounting flange 12 includes bolt holes 12b formed therein.

A plurality of sub reinforcing ribs 13a extending substantially toward the center of the differential gear unit housing 13 are vertically radially provided on the outer surface of the differential gear unit housing 13, and reinforcing rib 14 for supporting the sub reinforcing ribs 13a are vertically provided parallely with the oil pan joint surface 11a and sub reinforcing ribs 13b are also vertically provided on the opposite side of the sub reinforcing ribs 13a putting the reinforcing rib 14 therebetween.

Accordingly, in the state where the oil pan 3 is disposed on the lower side of the casing body 1, a pocket part 4 is formed by being defined in the right and left direction with a side wall 15 of the casing body 1 and one sub reinforcing rib 13a and closed on the lower side with the reinforcing rib 14.

The reinforcing rib 14 is thick-walled compared with the other sub reinforcing ribs 13a, 13b, and is disposed in its lower surface, displaced slightly upward from the oil pan joint surface 11a in the assembled state in FIG. 1.

In the reinforcing rib 14 which forms the lower part of the pocket part 4 in FIG. 1 there is formed a processing/assembling hole 5. On the circumference of the processing/assembling hole 5 there is protruded a boss 5a with its end surface set to be flush with the oil pan joint surface 11a. This allows the end surface of the boss and the oil pan joint surface to be simultaneously processed to facilitate the fabrication thereof.

In the transmission casing of the embodiment constructed as described above a locating pin is inserted into the processing/assembling reference hole 5 for positioning upon assembling and processing of the transmission casing.

In the state where the transmission casing of the present embodiment is mounted on a car, rainwater entering the pocket part 4 falls from the processing/assembling reference hole 5 without staying in the pocket part 4. In the present embodiment the processing/assembling reference hole 5 is thus used as a drainage hole.

In the present embodiment as described above the processing/assembling reference hole 5 is provided in the existing reinforcing rib 14 and part of the oil pan mounting flange 11 or housing mounting flange 12 is free from being protruded for providing the processing reference hole. As a result, a space is saved compared with the prior art by fractions of the flanges 11,12 not thus protruded to improve the degree of freedom of a design of the transmission casing and to reduce the material cost corresponding to fractions of protrusions.

Additionally, since the flanges 11,12 are not protruded, there is eliminated the possibility of the flanges interfering with peripheral instruments upon assembling and is hence eliminated the possibility of the location of the processing/assembling reference hole 5 being displaced owing to deformation and destruction of a protrusion which would be formed with the prior art. Since the processing/assembling reference hole 5 is provided in the reinforcing rib 14 that is thick-walled and has high rigidity as a result of multiplicative reinforcement with a plurality of the sub reinforcing ribs 13a, 13b, no clamping force is exerted on the processing/assembling reference hole 5 upon the flanges 11,12 being clamped, and even if any greater external force is exerted on the flanges the reference hole is difficult to be deformed and displaced. Since in the present embodiment the processing/assembling reference hole 5 has the high rigidity in such a manner, a hook can be engaged with the processing/assembling reference hole 5 for anchoring the transmission when the transmission is transported as a product after its being assembled.

In the present embodiment, since the processing/assembling reference hole 5 is provided at the location of the pocket part 4 of the reinforcing rib 14, the processing/assembling reference hole 5 is useable as a drainage hole for the pocket part 4.

As described above, in the transmission casing according to the present invention, a reference hole for use in processing and assembling is provided in an existing reinforcing rib constituting the pocket part so that there is eliminated the need of part of the oil pan mounting flange or the housing mounting flange being protruded to provide the reference hole. And hence a space can be saved by a fraction of each flange which might be needed to form a protrusion, thereby improving the degree of freedom of a design of the transmission casing and reducing the material cost corresponding to the fraction compared with the prior art.

There is reduced the possibility of the reinforcing ribs and the reference hole interfering with peripheral instruments upon assembling compared with the case where a protrusion is provided on each flange, and no clamping force is exerted on the hole even also upon clamping each flange so that the transmission casing is difficult to be damaged and deformed to prevent the reference hole from being displaced compared with the prior art.

The reference hole is usable as a drainage hole to reduce processing labor and the cost compared with a case where the reference hole and the drainage hole are separately provided.

Furthermore, in the transmission casing in which the reinforcing rib is displaced upward from the oil pan joint surface since a boss is protruded on the circumference of the reference hole and the lower end surface of which boss is set to be flush with the oil pan joint surface, the end surface of the boss surrounding the reference hole and the oil pan joint surface can be simultaneously processed.

What is claimed is:

1. A transmission casing comprising:

a casing body, an oil pan mounting flange having an oil pan joint surface for joining an end surface of an oil pan with the casing body, a housing mounting flange disposed substantially perpendicularly to said oil pan mounting flange and having a housing joint surface for joining an end surface of a housing with the casing body, a reinforcing rib formed on said casing body parallely with said oil pan joint surface, a pocket part formed with said reinforcing rib and two adjacent walls that intersect an upper surface of said reinforcing rib substantially perpendicularly, and a reference hole formed through said upper surface of said reinforcing rib at a location of the pocket part.

2. A transmission casing according to claim 1, wherein:

the casing body includes a transmission mechanism housing and a differential gear unit housing, said oil pan mounting flange is formed on a peripheral edge of an opening provided in a lower surface of the transmission mechanism housing of the casing body, said housing mounting flange is formed on a peripheral edge of an opening provided in a side surface of the differential gear unit housing of the casing body, said reinforcing rib is perpendicularly provided on an outer surface of said differential gear unit housing, said adjacent walls comprise an outer wall of said differential gear unit housing and a sub reinforcing rib connected with said reinforcing rib, and said pocket part is formed surrounded by an outer surface of said differential gear unit housing, the upper surface of the reinforcing rib, and a side surface of the sub reinforcing rib.

3. A transmission casing comprising:

a casing body, an oil pan mounting flange having an oil pan joint surface for joining an end surface of an oil pan with the casing body, a housing mounting flange disposed substantially perpendicularly to said oil pan mounting flange and having a housing joint surface for joining an end surface of a housing with the casing body, a reinforcing rib formed on said casing body parallely with said oil pan joint surface, a pocket part formed with said reinforcing rib and two adjacent walls that intersect an upper surface of said reinforcing rib substantially perpendicularly, and a reference hole formed through said reinforcing rib at a location of the pocket part, wherein a lower surface of said reinforcing rib is disposed slightly upward from the oil pan joint surface, a boss is formed protruded on the circumference of said reference hole, and a lower end surface of said boss and said oil pan joint surface are in the same plane.

4. A transmission casing according to claim 3, wherein:

the casing body includes a transmission mechanism housing and a differential gear unit housing, said oil pan mounting flange is formed on a peripheral edge of an opening provided in a lower surface of the transmission mechanism housing of the casing body, said housing mounting flange is formed on a peripheral edge of an opening provided in a side surface of the differential gear unit housing of the casing body, said reinforcing rib is perpendicularly provided on an outer surface of said differential gear unit housing, said adjacent walls comprise an outer wall of said differential gear unit housing and a sub reinforcing rib connected with said reinforcing rib, and said pocket part is formed surrounded by an outer surface of said differential gear unit housing, the upper surface of the reinforcing rib, and a side surface of the sub reinforcing rib.

* * * * *